US012580625B2

(12) United States Patent
Abebe et al.

(10) Patent No.: US 12,580,625 B2
(45) Date of Patent: Mar. 17, 2026

(54) METHOD AND APPARATUS FOR REPORTING CHANNEL STATE INFORMATION IN WIRELESS COMMUNICATION SYSTEMS

(71) Applicant: Samsung Electronics Co., Ltd., Gyeonggi-do (KR)

(72) Inventors: Ameha Tsegaye Abebe, Gyeonggi-do (KR); Youngrok Jang, Gyeonggi-do (KR); Hyoungju Ji, Gyeonggi-do (KR); Seongmok Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 18/556,279

(22) PCT Filed: May 11, 2022

(86) PCT No.: PCT/KR2022/006732
§ 371 (c)(1),
(2) Date: Oct. 19, 2023

(87) PCT Pub. No.: WO2022/240181
PCT Pub. Date: Nov. 17, 2022

(65) Prior Publication Data
US 2024/0204849 A1 Jun. 20, 2024

(30) Foreign Application Priority Data

May 11, 2021 (KR) ........................ 10-2021-0060885
Aug. 26, 2021 (KR) ........................ 10-2021-0112917

(51) Int. Cl.
*H04B 7/06* (2006.01)
(52) U.S. Cl.
CPC ......... *H04B 7/0639* (2013.01); *H04B 7/0626* (2013.01)

(58) Field of Classification Search
CPC . H04B 7/04; H04B 7/06; H04B 7/024; H04B 7/0456; H04B 7/0626;
(Continued)

(56) References Cited

U.S. PATENT DOCUMENTS

2021/0328644 A1* 10/2021 Hao ...................... H04B 7/0639
2022/0094399 A1* 3/2022 Gao ...................... H04B 7/0626
(Continued)

FOREIGN PATENT DOCUMENTS

KR 10-2021-0012304 2/2021
WO WO 2020/056708 3/2020
WO WO 2020/144602 7/2020

OTHER PUBLICATIONS

PCT/ISA/210 Search Report dated Aug. 8, 2022, issued on PCT/KR2022/006732, pp. 3.
(Continued)

*Primary Examiner* — Shawkat M Ali
(74) *Attorney, Agent, or Firm* — The Farrell Law Firm, P.C.

(57) ABSTRACT

The disclosure relates to a 5G or 6G communication system for supporting a higher data transmission rate. A user equipment (UE) in a communication system is provided. The UE comprising a transceiver, and a controller configured to receive, from a base station, configuration information for enabling precoding matrix indicator (PMI) for single transmit-receive point (STRP) and multi TRP (mTRP) operation on non-coherent joint transmission (NCJT) mode; generate channel state information (CSI) including PMI for sTRP or PMI for mTRP, based on UE capability and configuration associated with partial PMI; and transmit, to the base station, the CSI including the PMI for sTRP or PMI for mTRP.

15 Claims, 13 Drawing Sheets

(58) Field of Classification Search
CPC ....... H04B 7/0639; H04L 1/00; H04L 1/0026;
H04L 5/00; H04L 5/0048; H04L 25/02;
H04W 24/08; H04W 24/10; H04W 48/20;
H04W 52/02; H04W 72/044; H04W
72/232
USPC ................ 375/219, 260, 262, 267, 295, 316
See application file for complete search history.

(56) References Cited

U.S. PATENT DOCUMENTS

| | | | |
|---|---|---|---|
| 2022/0256458 A1 | 8/2022 | Noh et al. | |
| 2022/0321175 A1* | 10/2022 | Tosato .................. | H04L 1/0026 |
| 2023/0328569 A1* | 10/2023 | Khoshnevisan ..... | H04B 7/0639 |
| | | | 370/252 |
| 2024/0306023 A1* | 9/2024 | Khoshnevisan ...... | H04L 5/0057 |

OTHER PUBLICATIONS

PCT/ISA/237 Written Opinion dated Aug. 8, 2022, issued on PCT/KR2022/006732, pp. 4.

Qualcomm Incorporated, "CSI enhancements: MTRP and FR1 FDD reciprocity", 3GPP TSG RAN WG1 #104bis-e R1-2103156 e-Meeting, Apr. 12-Apr. 20, 2021, pp. 17.

Ericsson, "CSI enhancements for Multi-TRP and FR1 FDD reciprocity", 3GP TSG-RAN WG1 Meeting #104-e R1-2101687 Online, Jan. 25-Feb. 5, 2021, pp. 22.

ZTE, "CSI enhancements: MTRP and FR1 FDD reciprocity", 3GPP TSG RAN WG1 #104b-e R1-2102666 e-Meeting, Apr. 12-Apr. 20, 2021, pp. 15.

* cited by examiner

[1101]

CMR group-1= {CMR$_{1,1}$ , CMR$_{1,2}$ , $\cdots$ , CMR$_{1,K1}$ }

CMR group-2= {CMR$_{2,1}$ , CMR$_{2,2}$ , $\cdots$ , CMR$_{2,K2}$ }

[1102]

CMR pair-1={CMR$_{1,x1}$ ,CMR$_{1,y1}$ }

CMR pair-2={CMR$_{1,x2}$ ,CMR$_{1,y2}$ }

$\vdots$

CMR pair-N={CMR$_{1,xN}$ ,CMR$_{1,yN}$ }

Method III.1.1:

[1103]

| 0 | 1 | 0 | 0 |

CMR pair-2 is shared

N=4

Method III.1.2:

[1103]

| 0 | 1 |

The first 2 CMR pairs, i.e., CMR pair-1 and pair-2 are shared

Log$_2$N=2

METHOD AND APPARATUS FOR REPORTING CHANNEL STATE INFORMATION IN WIRELESS COMMUNICATION SYSTEMS

PRIORITY

This application is a National Phase Entry of PCT International Application No. PCT/KR2022/006732, which was filed on May 11, 2022, and claims priority to Korean Patent Application Nos. 10-2021-0060885 and 10-2021-0112917, which were filed on May 11, 2021, and Aug. 26, 2021, respectively, the entire content of each of which is incorporated herein by reference.

TECHNICAL FIELD

The present disclosure relates to the field of 5G communication networks and more particularly to the behavior of user equipment (UE) towards reporting channel state information (CSI) for channel measurement hypotheses based on single transmission reception point (sTRP) and multiple transmission reception points (mTRP) in noncoherent joint transmission (NCJT) mode.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The principal object of the disclosure herein is to disclose methods and apparatus for determining the channel state information (CSI), in particular, precoder matrix index (PMI) feedback in a communication network, wherein the communication network is at least one of the Fifth Generation (5G) standalone network and a 5G non-standalone (NAS) network.

As specific object of the disclosure herein is to disclose methods and systems for determining the user equipment's (UE's) behavior upon sending PMI feedback for channel measurement hypotheses for single transmission reception point (sTRP) and multiple transmission reception points (mTRP) operating in non-coherent joint transmission (NCJT) mode.

Another object of the disclosure herein is to disclose methods and apparatus for configuring a UE so as it dynamically determines the PMI overhead upon sending PMI feedback for channel measurement hypotheses for sTRP and mTRP operating in NCJT mode.

Solution to Problem

The present disclosure has been made to address the above-mentioned problems and disadvantages, and to provide at least the advantages described below.

In accordance with an aspect of the present disclosure, a user equipment (UE) in a communication system in a communication system is provided. The UE comprising a transceiver; and a controller configured to: receive, from a base station, configuration information for enabling precoding matrix indicator (PMI) for single transmit-receive point (sTRP) and multi TRP (mTRP) operation on non-coherent joint transmission (NCJT) mode; generate channel state information (CSI) including PMI for sTRP or PMI for mTRP, based on UE capability and configuration associated with partial PMI; and transmit, to the base station, the CSI including the PMI for sTRP or PMI for mTRP.

In accordance with another aspect of the present disclosure, a base station in a communication system is provided. The base station comprising a transceiver; and a controller configured to: transmit, to a user equipment (UE), configuration information for enabling precoding matrix indicator (PMI) for single transmit-receive point (sTRP) and multi TRP (mTRP) operation on non-coherent joint transmission (NCJT) mode; receive, from the UE, channel state information (CSI) including PMI for sTRP or PMI for mTRP based on UE capability and configuration associated with partial PMI.

In accordance with another aspect of the present disclosure, a method performed by a user equipment (UE) in a communication system is provided. The method comprising receiving, from a base station, configuration information for enabling precoding matrix indicator (PMI) for single transmit-receive point (sTRP) and multi TRP (mTRP) operation on non-coherent joint transmission (NCJT) mode; generating channel state information (CSI) including PMI for sTRP or PMI for mTRP, based on UE capability and configuration associated with partial PMI; and transmitting, to the base station, the CSI including the PMI for sTRP or PMI for mTRP.

In accordance with another aspect of the present disclosure, a method performed by a base station in a communication system is provided. The method comprising transmitting, to a user equipment (UE), configuration information for enabling precoding matrix indicator (PMI) for single transmit-receive point (sTRP) and multi TRP (mTRP) operation on non-coherent joint transmission (NCJT) mode; receiving, from the UE, channel state information (CSI) including PMI for sTRP or PMI for mTRP based on UE capability and configuration associated with partial PMI.

Advantageous Effects of Invention

Embodiments of the present disclosure provides methods and apparatus for determining the channel state information (CSI), in particular, precoder matrix index (PMI) feedback in a communication network, wherein the communication network is at least one of the Fifth Generation (5G) standalone network and a 5G non-standalone (NAS) network.

Embodiments of the present disclosure provides methods and systems for determining the user equipment's (UE's) behavior upon sending PMI feedback for channel measurement hypotheses for single transmission reception point (sTRP) and multiple transmission reception points (mTRP) operating in non-coherent joint transmission (NCJT) mode.

Embodiments of the present disclosure provides methods and apparatus for configuring a UE so as it dynamically determines the PMI overhead upon sending PMI feedback for channel measurement hypotheses for sTRP and mTRP operating in NCJT mode.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

MODE FOR THE INVENTION

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHZ, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Figure 1:
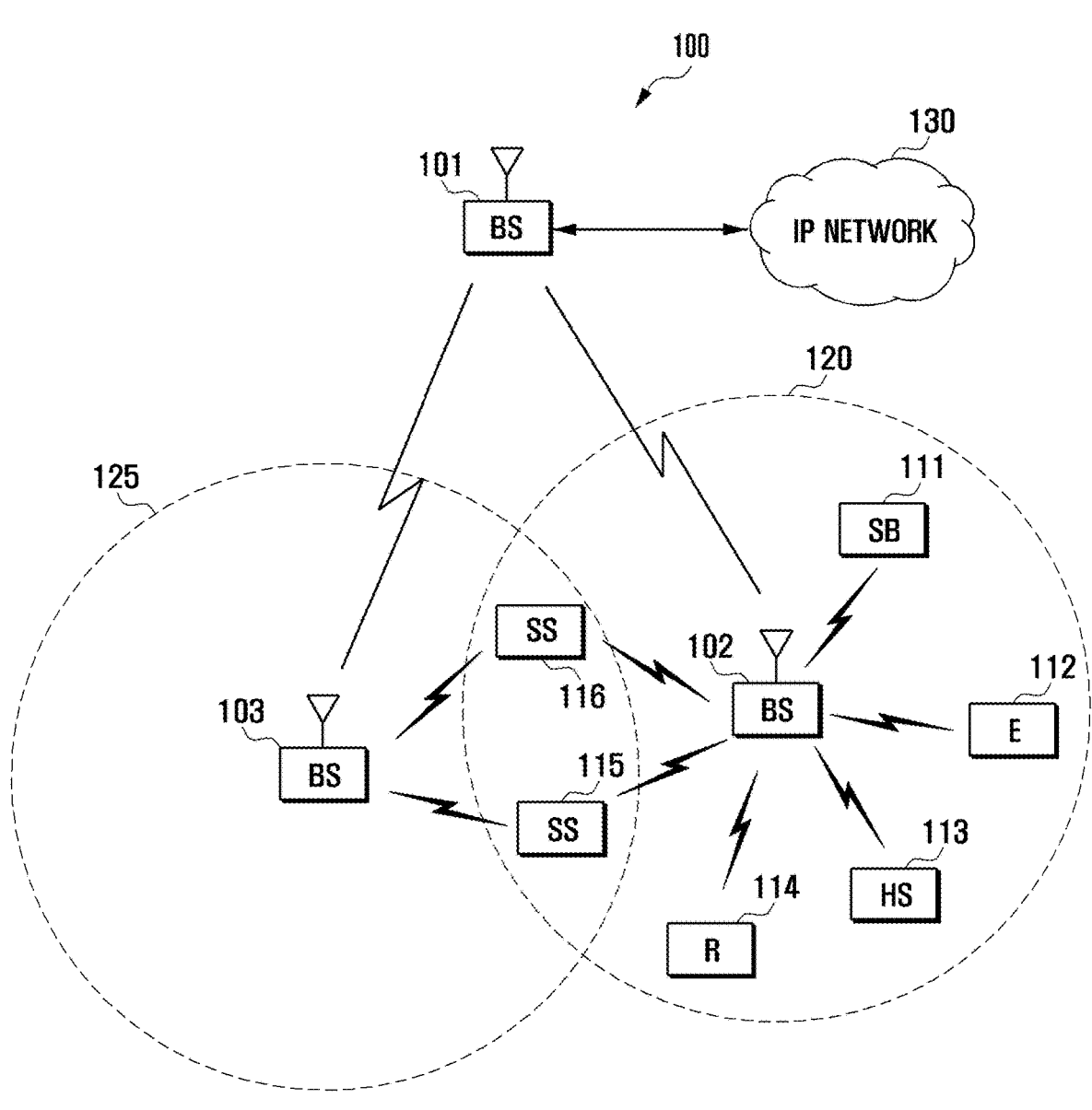
FIG. 1 illustrates an example wireless network

FIG. 1 illustrates an example wireless network 100 according to present disclosure. The embodiment of the wireless network 100 shown in FIG. 1 is for illustration only. Other embodiments of the wireless network 100 can be used without departing from the scope of present disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, the term 'gNB' can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
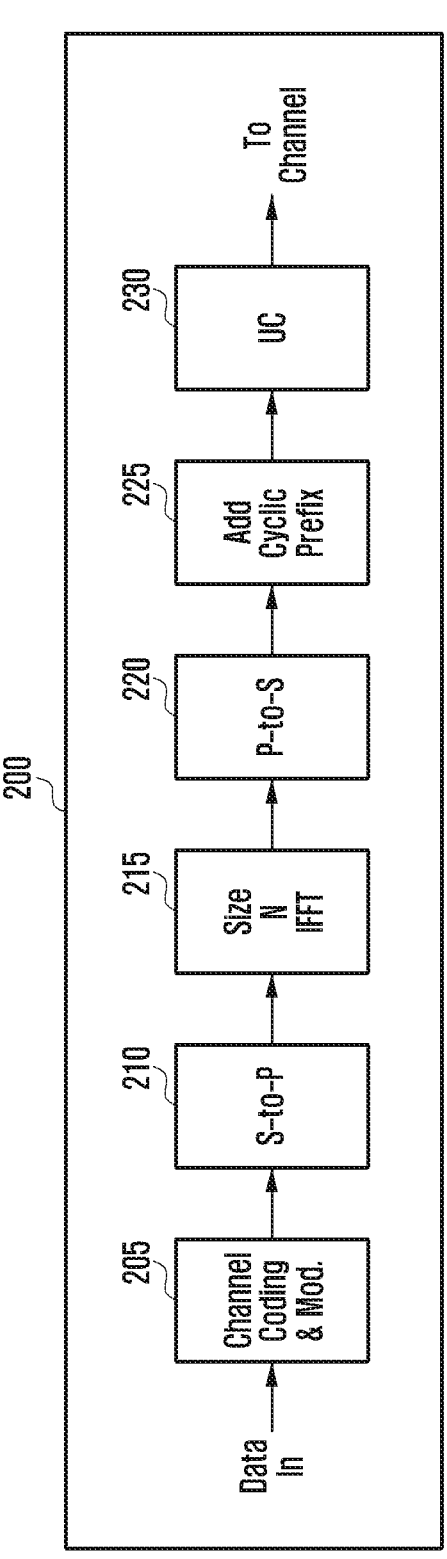
FIG. 2A illustrates an example wireless transmit paths according to embodiments of the present disclosure.
Figure 2B:
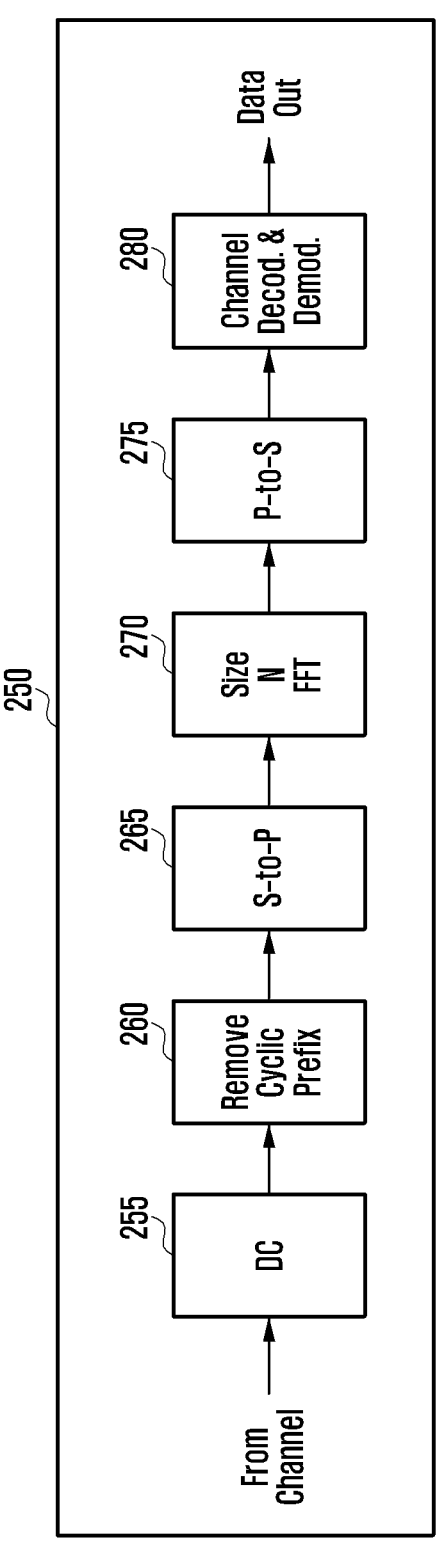
FIG. 2B illustrates an example wireless receive paths according to embodiments of the present disclosure.

FIGS. 2A and 2B illustrate example wireless transmit and receive paths according to present disclosure. In the following description, a transmit path 200 may be described as being implemented in an gNB (such as gNB 102), while a receive path 250 may be described as being implemented in a UE (such as UE 116). However, it will be understood that the receive path 250 can be implemented in an gNB and that the transmit path 200 can be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an upconverter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
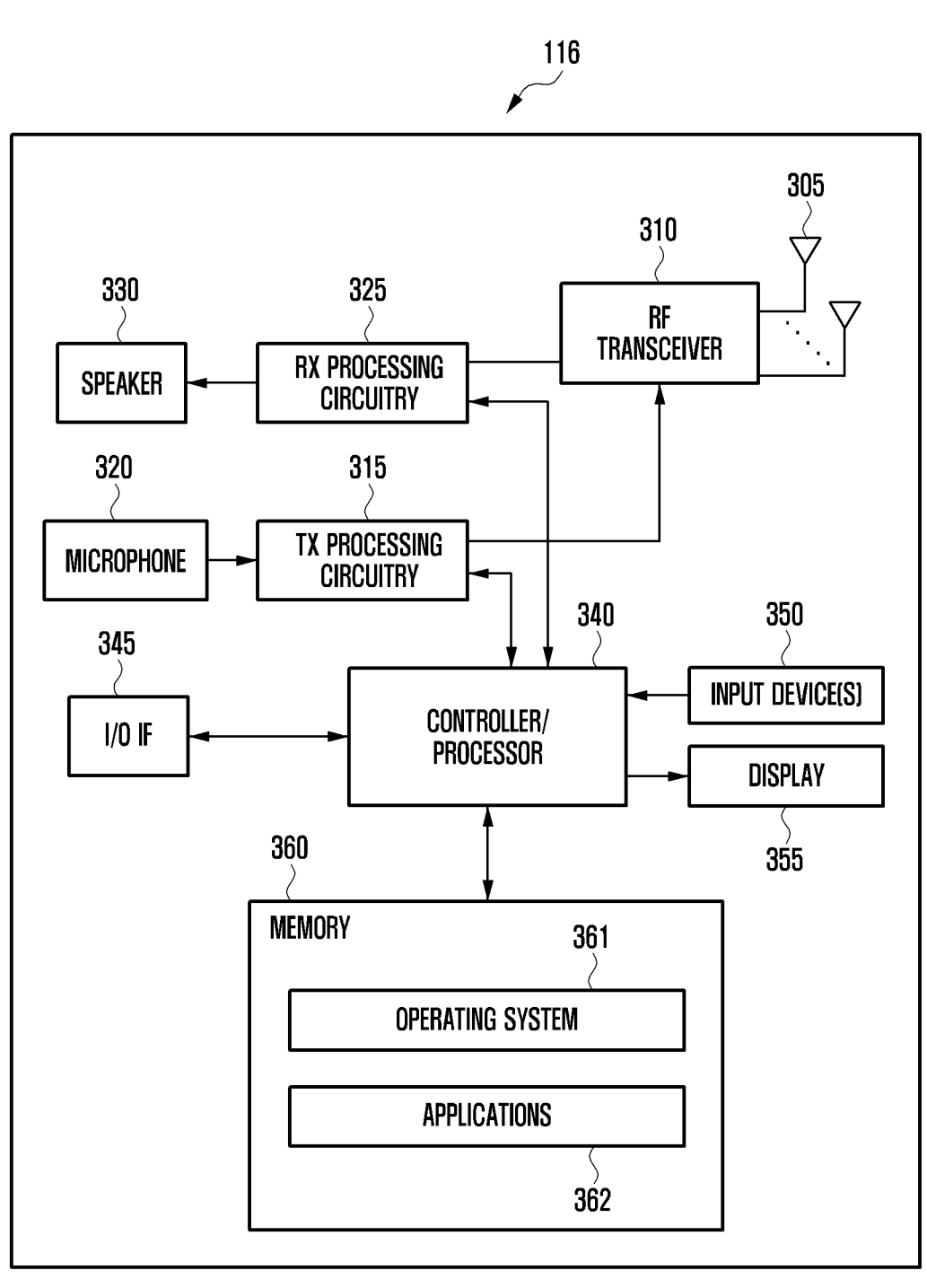
FIG. 3A illustrates an example UE according to embodiments of the present disclosure.

FIG. 3A illustrates an example UE 116 according to present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 can control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites. The memory 360 is coupled to the main processor 340. Part of the memory 360 can include a random access memory (RAM), and another part of the memory 360 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the main processor 340 can be divided into multiple processors, such as one or more central processing units (CPUs) and one or more graphics processing units (GPUs). Also, while FIG. 3A illustrates the UE 116 configured as a mobile telephone or smartphone, UEs can be configured to operate as other types of mobile or stationary devices.

Figure 3B:
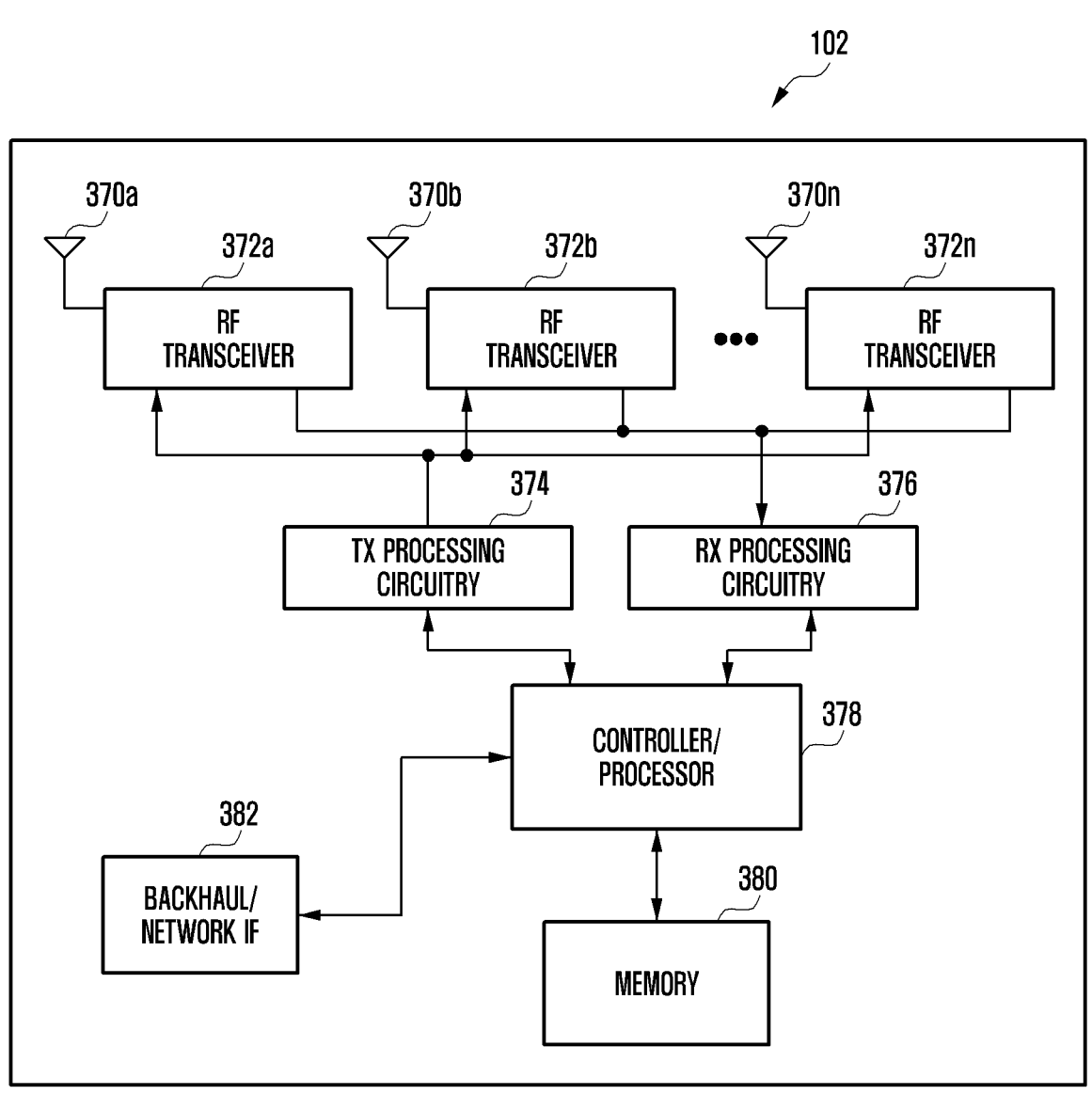
FIG. 3B illustrates an example gNB according to embodiments of the present disclosure.

FIG. 3B illustrates an example gNB 102 according to present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of present disclosure to any particular implementation of an gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 can support communications over any suitable wired or wireless connection(s). For example, when the gNB 102 is implemented as part of a cellular communication system (such as one supporting 5G, LTE, or LTE-A), the interface 382 can allow the gNB 102 to communicate with other gNBs over a wired or wireless backhaul connection. When the gNB 102 is implemented as an access point, the interface 382 can allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 can include a RAM, and another part of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 can include any number of each component shown in FIG. 3. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Figure 4:
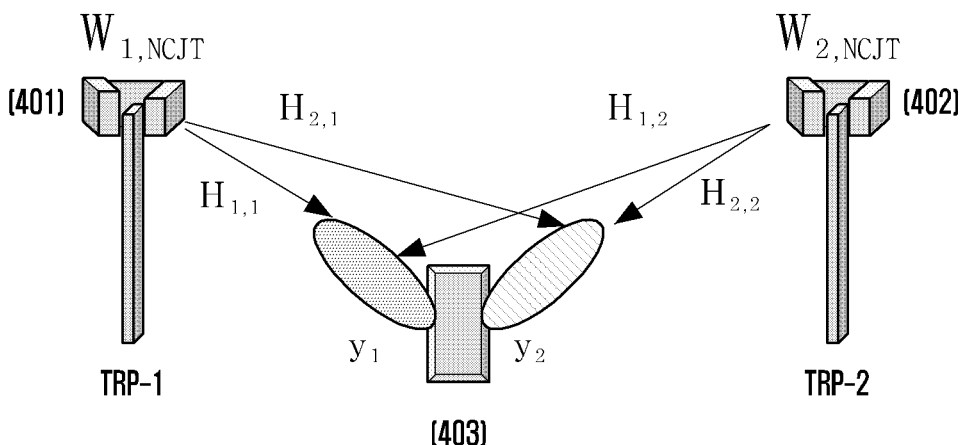
FIG. 4 illustrates an example of NCJT operation in which a UE receives multiple data streams precoded independently by multiple transmission and reception points (mTRP).

In release 17 of 5$^{th}$ generation mobile communication also known as new radio (NR), a further enhancement of multiple input multiple output (Fc-MIMO) is being considered to provide a specification support for non-coherent joint transmission (NCJT) [1]. In NCJT operation a UE (403) receives multiple data streams precoded independently by multiple transmission and reception points (TRPs) (401, 402) as shown in FIG. 4. This is in sharp contrast as compared to coherent joint transmission (CJT) wherein a user's data is jointly precoded across multiple TRPs/panels. NCJT as compared to CJT, relaxes the capacity requirement of the front-haul as it allows the data to be split into multiple independent streams delivered to TRPs via the front-haul and precoded independently. Without loss of generality, two case of implementations can be considered for NC-JT operation based on the frequency range of operation. Moreover, while discussing the proposed scheme, the discussion hereinafter is made based on two TRPs assumption while it can be generalized to an arbitrary number of TRPs without departing from the general scope of the disclosed invention.

In particular, in what is known as frequency range 1 (FR1) which refers to the sub 6 GHz frequency bands, the transmission from the two TRPs is assumed to be received by the same set of antennas. In this case, the received signal can be modeled as follows $$y = H_1 W_{1,NCJT} x_1 + H_2 W_{2,NCJT} x_2 + \omega \qquad \text{[Equation 1]}$$

where y represents the received signal at the UE and $H_i$, $W_{i,NCJT}$ and $x_i$ denote the channel matrix, precoding matrix and data vector, respectively, corresponding to the i={1, 2}-th TRP. Moreover, $\omega$ denotes a noise vector.

Owing to smaller antenna aperture area in what is referred as the frequency range 2 (FR2), i.e., above 6 GHz bands, it is common to assume that a UE is equipped with multiple antenna panels for FR2 operation. In this case, the downlink signal from multiple TRPs can be received separately by the two Rx panels and the received signal formulation in (1) is modified as $$\begin{bmatrix} y_1 \\ y_2 \end{bmatrix} = \begin{bmatrix} H_{11} & H_{12} \\ H_{21} & H_{22} \end{bmatrix} \begin{bmatrix} W_{1,NCJT} & 0 \\ 0 & W_{2,NCJT} \end{bmatrix} \begin{bmatrix} x_1 \\ x_2 \end{bmatrix} + \begin{bmatrix} \omega_1 \\ \omega_2 \end{bmatrix}. \qquad \text{[Equation 2]}$$

where $y_i$, $W_{i,NCJT}$ and $x_i$ denote the received signal, precoding matrix and data vector, respectively, corresponding to the i={1, 2}-th TRP. Whereas, the channel matrix $H_{j,i}$ represents the channel between the i-th TRP and j-th receive antenna panel at the UE. Moreover, $\omega_j$ denotes a noise vector associated with the j-th antenna panel.

Figure 5:
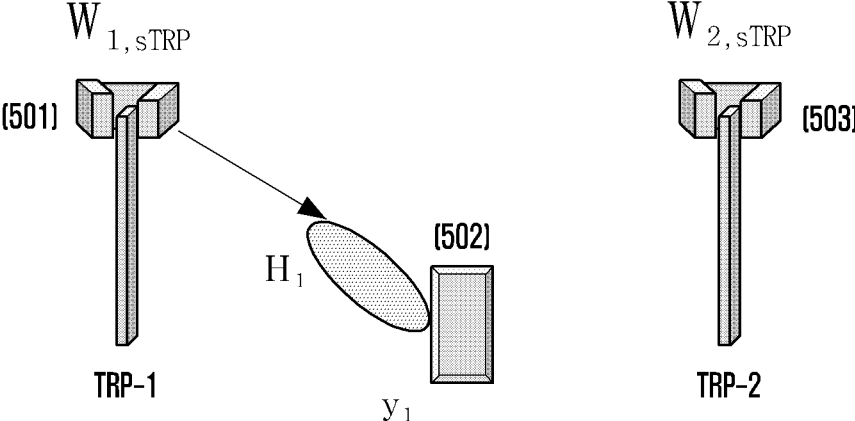
FIG. 5 illustrates an example of operation in which a UE receives single data streams precoded by a single transmission and reception points (sTRP).

Furthermore, a UE (502) may operate in a single TRP (sTRP) (501, 503) mode as shown in FIG. 5 when the channel of a particular TRP is significantly better than the others. In this case, the received signal model in (Eq. 1) and (Eq. 2) can be modified as $$y=H_iW_{i,sTRP}x_i+\omega \qquad \text{[Equation 3]}$$

where $H_i$, $W_{i,sTRP}$ and $x_i$ denote the channel matrix, precoding matrix and data vector, respectively, corresponding to the i={1, 2}-th TRP. The key difference between a single TRP based operation in (Eq. 3) and the NCJT based operations in (Eq. 1) and (Eq. 2) is that in the earlier case only one TRP transmits user's data at a time. Moreover, it should be apparent to those skilled in the art that the sTRP based operation doesn't specify the number of Rx panels used at the UE for the reception.

Upon reporting of CSI based on measurements for sTRP and NCJT hypotheses one of the CSI components namely the precoding matrix indicator (PMI) is reported to indicate the UE's preference of a precoding matrix to be used by the gNB. In this regard, the precoder selection for sTRP and NCJT hypotheses have one fundamental difference. In contrast to the precoder selection for sTRP hypotheses, the NCJT hypotheses selects the precoder matrices corresponding to the two TRPs jointly by considering the transmission from the other TRP as an interference from the data reception point of view of a reference TRP. As an example, while selecting $W_{i,NCJT}$ in (Eq. 2) the signal that is received through $H_{12}$ is considered as an interference. On the other hand, for NCJT operation it usually suffice to select $W_{i,sTRP}$ by solely considering $H_i$ without any additional interference term consideration. Therefore, the CSI computation for NCJT operation requires more processing effort and the precoders computed may well be different from the one computed for sTRP. However, as the PMI computation for both NCJT and sTRP hypotheses are mainly dependent on the channel of the desired signal, there are some fundamental characteristics shared by the precoders for the two hypotheses, i.e., $W_{i,sTRP}$ and $W_{i,NCJT}$.

Figure 6:
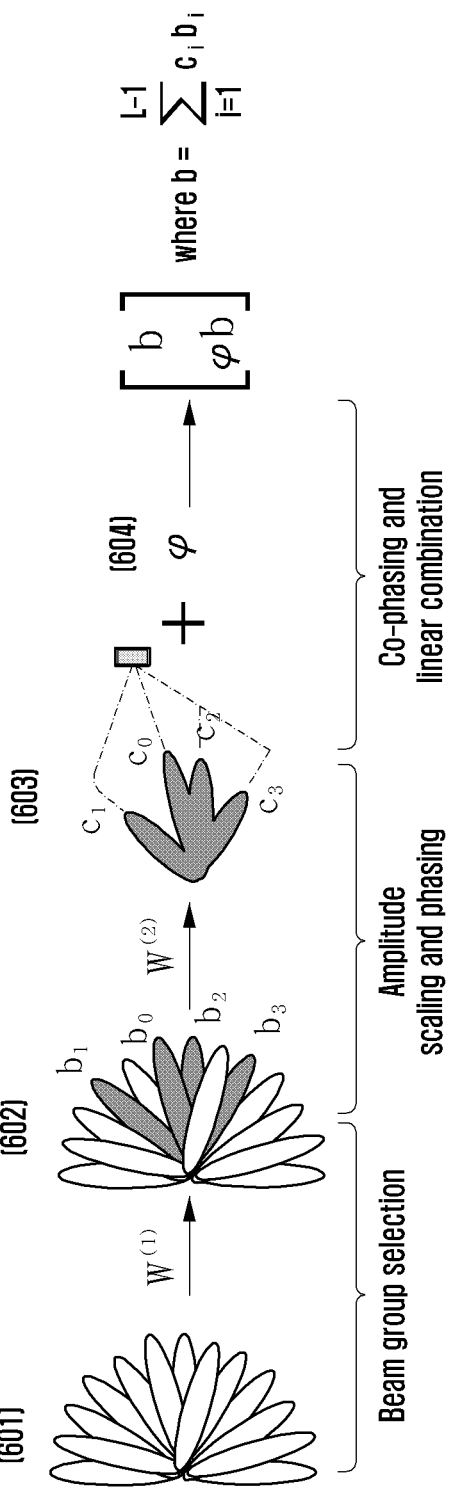
FIG. 6 illustrates an example of precoder selection based on Type II codebook in Rel. 15.

To illuminate a light on the common features shared by the precoders for sTRP and NCJT transmission, an example is given in FIG. 6 based on Type II codebook in Rel. 15. In the figure, it is shown that a UE may indicate the selected beam group consisting of L beams (602) from a set of possible beams in (601) via the first part of a precoding matrix $W^{(1)}$. Then the beams in the indicated beam group are scaled (603) in terms of amplitude and their phases get adjusted based on the second part of the precoding matrices $W^{(2)}$. As the beam group selection is mainly dependent on the dominant angles in which the transmitted signal power is concentrated, the precoders corresponding to sTRP and NCJT hypotheses may share the first part of the precoding matrix, i.e., $W^{(1)}$. Additionally, depending on the channel conditions, a different $W^{(2)}$ may be reported by the UE for the NCJT and sTRP hypotheses. In other words, while the first shared part of the precoder simply indicate the beams which carry most of the transmitted power, the second term can be used to mitigate cross link interference among the paired TRPs in the case of NCJT.

A description of example embodiments is provided on the follow pages.

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

The below flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Upon reporting PMI for both NCJT and sTRP measurement hypotheses, the simplest form of PMI feedback is to feedback all the complete PMIs among the two hypotheses without any consideration the possible redundancy. As an example, when the UE has to report PMI for two TRPs for the two hypotheses, four PMIs corresponding to $W_{1,sTRP}$, $W_{2,sTRP}$, $W_{1,NCJT}$, and $W_{2,NCJT}$ can be reported. Hereinafter, this type of reporting is referred as "non-restrictive PMI reporting". It is apparent that nonrestrictive PMI reporting may incur too much overhead. In this regard, a single PMI reporting can be considered per each TRP wherein it is later applied to either of the two hypotheses. For example, a UE may report PMIs based on just sTRP hypotheses, i.e., $W_{1,sTRP}$, $W_{2,sTRP}$, and then the same PMI could be applied for NCJT operation too. Hereinafter, this PMI reporting is referred as "fully-shared PMI reporting" or "omission-based PMI reporting". It can be noticed that fully-shared PMI reporting reduces the PMI overhead by half. However, as the PMI is computed based on one hypothesis while it could be applied for the other, it may result in performance degradation. As an example if the PMI is reported based on sTRP hypothesis and applied to NCJT hypothesis, performance degradation may occur as a result of cross link interference.

Taking the above scenarios into account, the disclosed invention proposes a mechanism to partially share the PMI among the two hypotheses. In this regard, the level of partial sharing of PMI could be decided by the UE based on the observed orthogonality of the channels among the two (or more) TRPs. In the two extreme cases, the partial sharing could also cover non-restrictive and fully-shared PMI reporting when the observed channel among the two TRPs are highly correlated and fully orthogonal (non-interfering), respectively.

In the following the three CSI sharing mechanism are stated explicitly

Method I-1 (Unrestricted PMI): Upon CSI reporting for NCJT and sTRP hypotheses, if a UE reported a capability separatePMIReportForNCJT and did not receive a higher layer IE partialPMIforNCJT, it independently calculates and reports PMIs for sTRP and NCJT hypotheses.

Method I-2 (Fully-shared PMI): Upon CSI reporting for NCJT and sTRP hypotheses, if a UE did not report a capability separatePMIReportForNCJT for separately calculating PMI for NCJT hypothesis and did or did not receive a higher layer parameter partialPMIforNCJT, it reports one PMI for sTRP and NCJT hypotheses and the BS applies the same PMI for both hypotheses.

Method I-3 (Partially-shared PMI): Upon CSI reporting for NCJT and sTRP hypotheses, if a UE reported a capability "separatePMIReportForNCJT" for separately calculating PMI for NCJT hypothesis and received a higher layer IE partialPMIforNCJT, it reports all the components of PMI for sTRP hypotheses and partial components of PMI for NCJT hypothesis, corresponding to the configured codebook. The BS then constructs the full PMI for NCJT hypothesis by combining the reported STRP PMI components corresponding to unreported PMI components and the reported PMI components for NCJT hypothesis.

Figure 7:
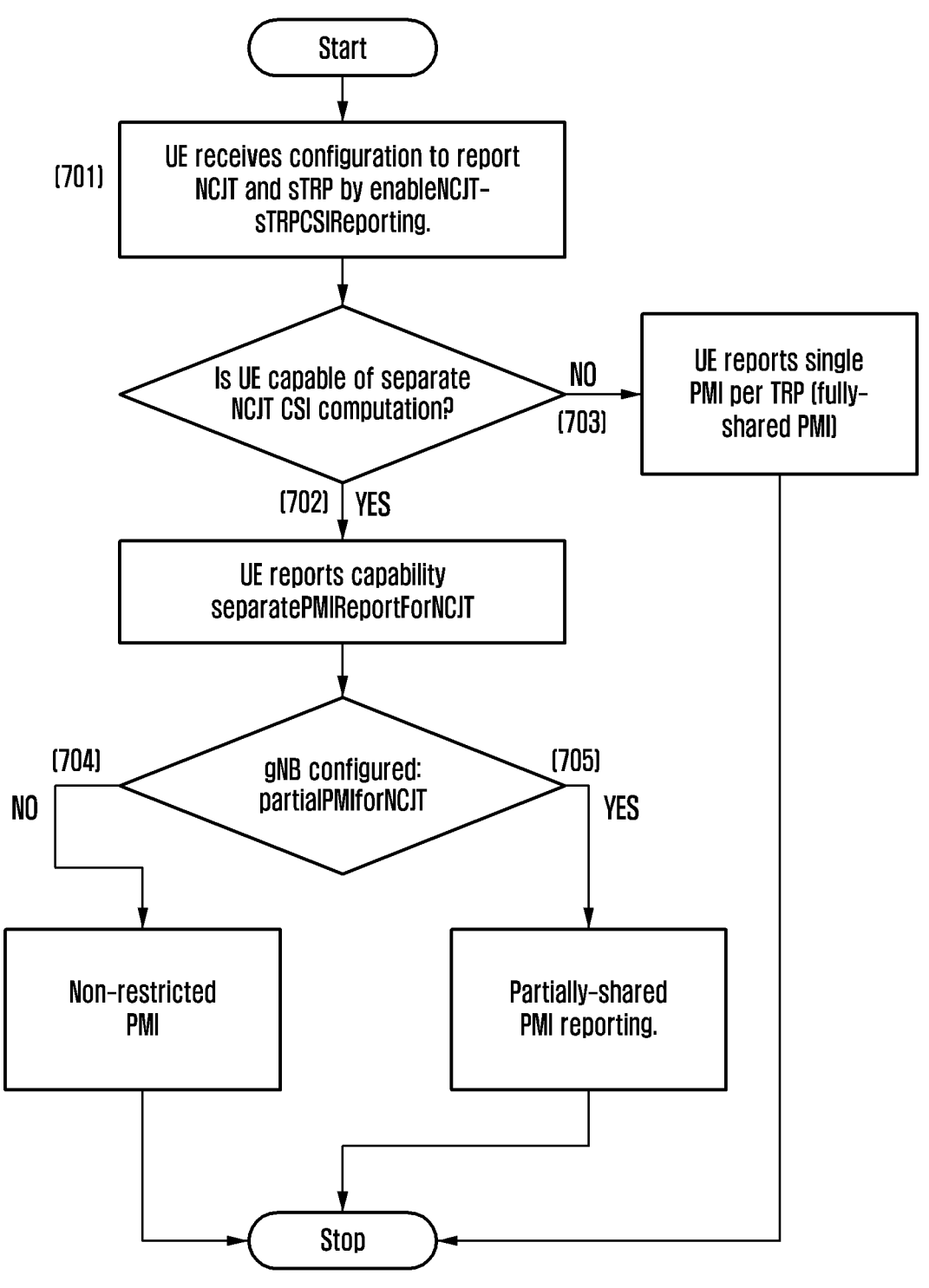
FIG. 7 illustrates a flowchart for UE's operation towards reporting PMI for sTRP and NCJT hypotheses related to the disclosure herein.

In one embodiment (I.1.) disclosed herein, a flowchart for UE's operation towards reporting PMI for sTRP and NCJT hypotheses is given in FIG. 7. In order to indicate to the UE that it can dynamically switch between sTRP and NCJT schemes, an RRC configuration such as enableNCJT-sTRPCSIReporting (701) could be configured. Upon receiving this configuration, a UE may indicate whether it is capable of separate CSI computation for NCJT hypothesis. As it is indicated in the previous section, CSI computation for NCJT requires added computational complexity as compared to sTRP CSI computation. If a UE is not capable of such separate CSI computation for NCJT operation (703), it simply reports CSI for sTRP hypotheses. This (703) can be considered as a fully-shared PMI as the reported PMI may later be employed for NCJT operation too. On the other hand, if the UE is capable of separate CSI computation for NCJT hypothesis, then it reports its capability by sending indication separatePMIReportForNCJT (702). Upon receiving UE's capability indication for its capability to compute a separate CSI for NCJT hypothesis, the gNB may or may not configure a UE with partialPMIforNCJT. If the UE is not configured with partialPMIforNCJT (704), then it reports CSI based on Method 1-1, i.e., unrestricted PMI reporting. In other words, it reports the PMI corresponding to the two hypotheses without consideration of any omission of PMI components. On the contrary, if the UE receives a configuration information element (IE) for partialPMIforNCJT (705), it then reports PMI based on Method 1-3 (partially-shared PMI reporting).

Figure 8:
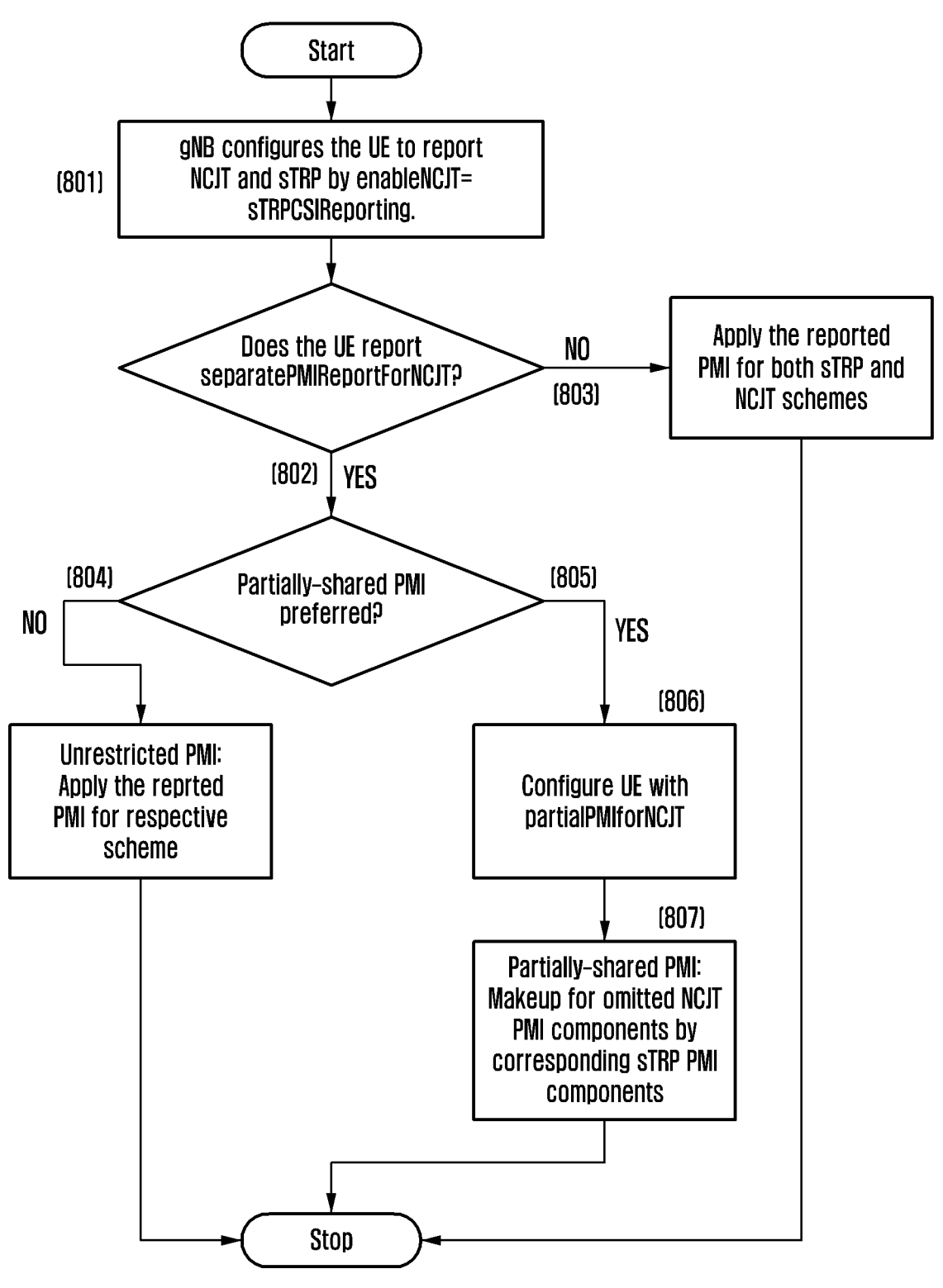
FIG. 8 illustrates a flowchart depicting gNBs behavior towards PMI sharing in STRP and NCJT operations.

In another embodiment (I.2.) a flowchart depicting gNBs behavior towards PMI sharing in sTRP and NCJT operations is given in the FIG. 8. When a gNB intends to dynamically switch between sTRP and NCJT schemes with a reference UE, it configures it with enableNCJT-STRPCSIReporting (801). Based on this configuration, the gNB expects the UE to report its capability on supporting separate PMI reporting for NCJT. If the gNB does not receive capability report separatePMIReportForNCJT, then it applies the reported PMI for both sTRP and NCJT schemes (803). Otherwise, if the gNB receives UEs capability separatePMIReport-ForNCJT, then it checks if it is preferable for the UE to operate on Partially-shared PMI reporting or unrestricted PMI depending on its implementation and desired PMI overhead-to-performance operation point (802). If the gNB does not prefer partially-shared PMI operation (804), it simply expects the UE to report unrestricted PMI and apply the reported PMIs to the corresponding schemes. In the meanwhile, if the gNB prefers a partially-shared PMI reporting (805), it then configures the UE with partialPMIforNCJT (806) and then operates on partially-shared PMI mode (807). In other words, in (807) the gNB expects a complete set of PMI components for sTRP operation and subset of PMI components to be omitted from PMI report that corresponds to NCJT operation. In this case the gNB replaces omitted NCJT PMI components by corresponding sTRP PMI components.

Level of Partially-Shared PMI Indication

Figure 9:
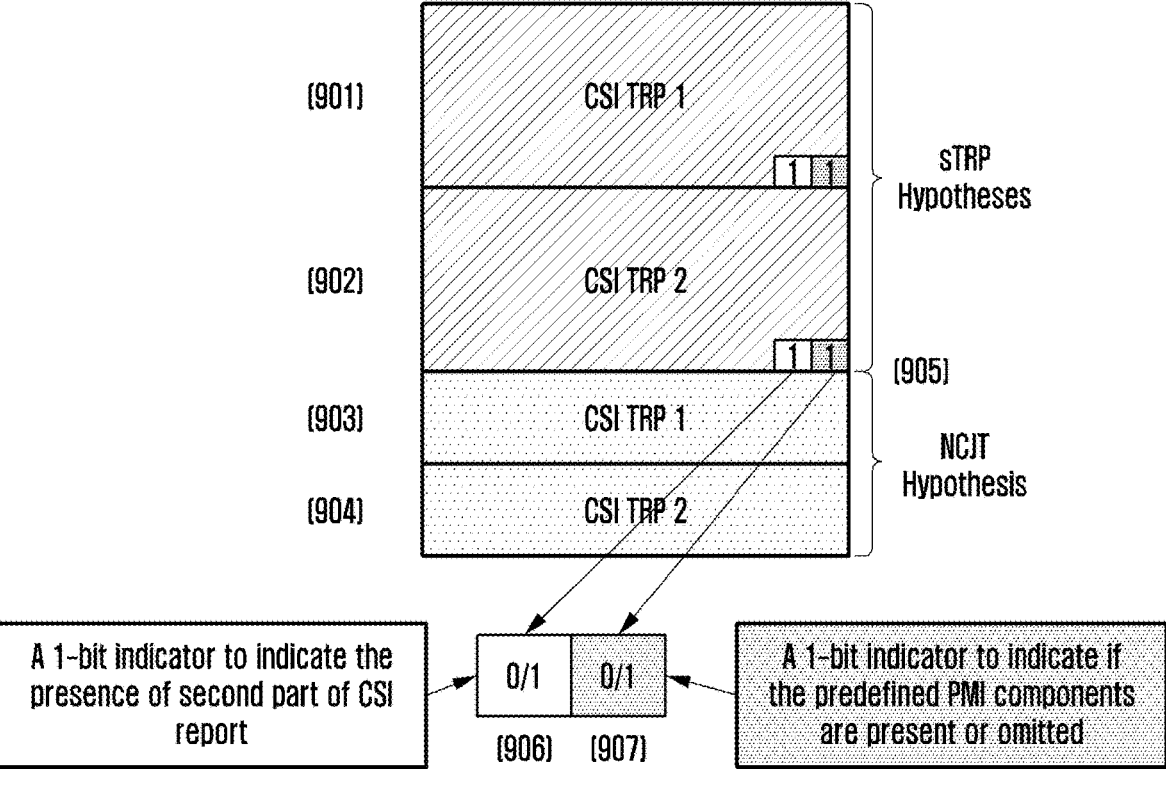
FIG. 9 illustrates an example for one realization of the disclosed invention in with a two-part CSI reporting.

In Rel-17 FeMIMO, a two part CSI reporting is agreed to support sTRP and NCJT operations. In one embodiment (II.1) of the disclosed invention, an example for one realization of the disclosed invention in embodiment I with a two-part CSI reporting (905) is depicted in FIG. 9. In the first part of the CSI report, a complete CSI is reported for both TRPs (901) and (902) for sTRP hypothesis with a 2-bits indicator per CSI report. The CSIs reported in the first part are complete and self-interpretable.

Method II-1: If a UE is configured with partialPMI-forNCJT and it reports a partial set of PMI components for NCJT hypothesis, then it omits PMI components in a predefined set of PMI components given as $S=\{i_{x,y,z}\}$.

In another embodiment (II.1.1), the first bit (906) of the 2-bits indicator is used as an indicator to indicate whether the second part of CSI (903, 904) is present or not. If this bit is set to 1, a second part of the CSI is present for NCJT hypothesis. Otherwise, if this bit is set to 0, the second part of the CSI report corresponding to NCJT hypothesis is omitted, therefore, the CSI reporting is fully-shared CSI reporting. In this case, the CSI reported for sTRP hypotheses would be used for NCJT hypothesis too.

In another part of embodiment (II.1.2), the second bit (907) of the 2-bits indicator is used as an indicator to indicate whether the second part of CSI (903, 904) includes the predefine set of PMI components $S=\{i_{x,y,z}\}$ defined in Method II-1. If this bit is set to 1 and the first bit of the 2-bits indicator is also set to 1, then the second part of CSI is present and includes all the PMI components including $S=\{i_{x,y,z}\}$. This case can be considered as unrestricted CSI reporting. If the second bit of the 2-bits indicator is set to 0 and the first bit of the 2-bits indicator is set to 1, then second part of CSI is present and does not include the predefined set of PMI components in $S=\{i_{x,y,z}\}$, therefore, the CSI reporting is partially-shared CSI reporting. In this case, the gNB use the PMI components in $S=\{i_{x,y,z}\}$ reported for sTRP instead of unreported components and combine them with the reported PMI components in the second part of the CSI report to have a complete set of PMI components for NCJT hypothesis.

In one embodiment (II.2), the disclosed invention presents dynamic partial-sharing (omission) of PMI components for NCJT hypotheses based on channel condition. The dynamic partial-sharing (partial omission), detailed in Method II-2 below, allows to readjust the CSI overhead associated to the NCJT hypothesis, i.e., the size of the second part of the CSI report, based on the cross-link interference measured by the UE.

Method II-2: If the UE is configured with partialPMI-forNCJT and it reports a partial set of PMI components for NCJT hypothesis, then it omits PMI components in a set of PMI components given as $S=\{i_{x,y,z}\}$, where $S=\{i_{x,y,z}\}$ is indicated by a bit map within the first part of CSI report.

Figure 10:
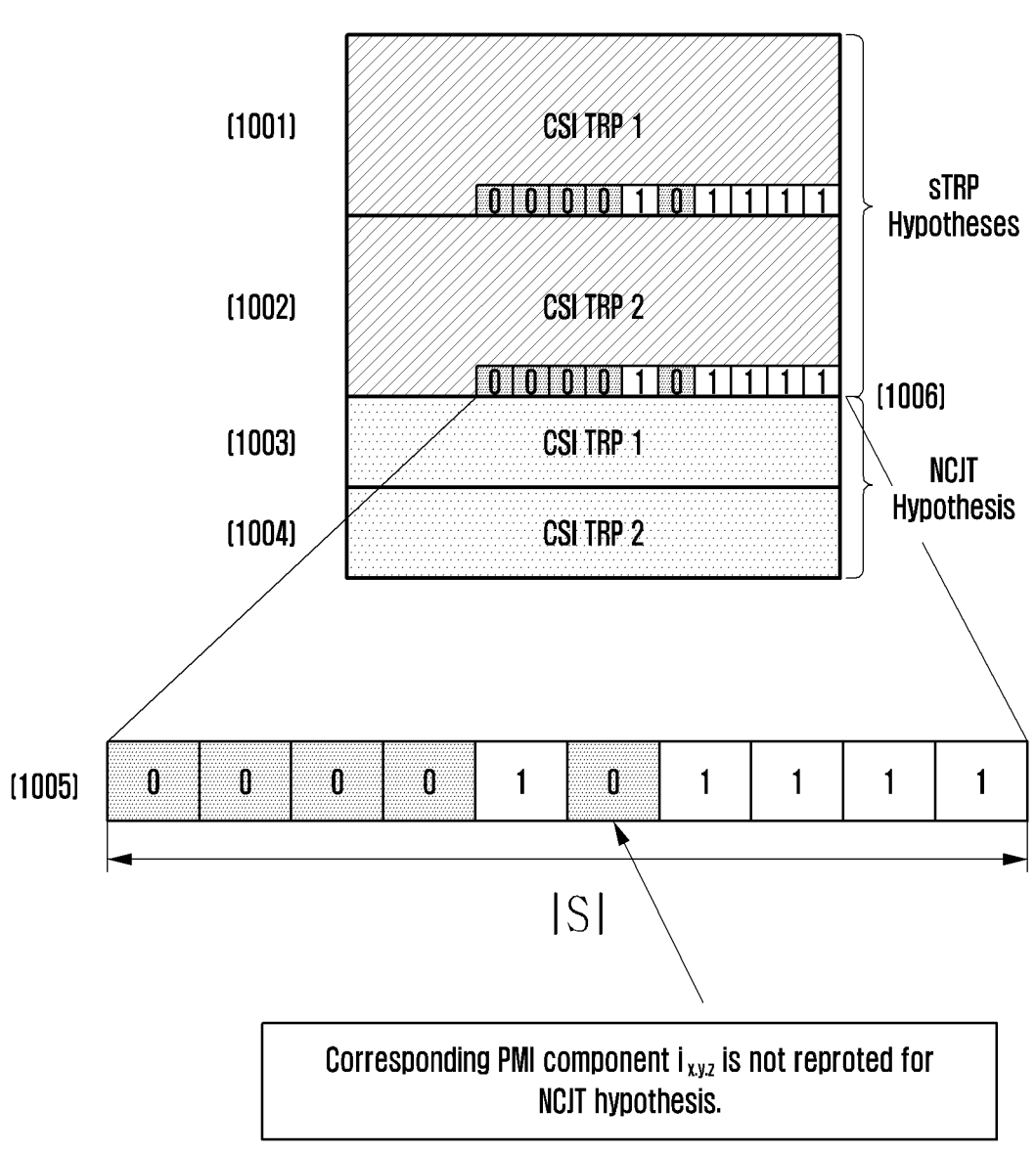
FIG. 10 depicts an example for another realization of the part of disclosed invention with a two-part CSI reporting.

In another embodiment (II.2.1), an example for realization of the part of disclosed invention with a two-part CSI reporting (1006) is depicted in FIG. 10. In the first part, a full CSI is reported for both TRPs (1001) and (1002) with a bitmap indicator (1005) per CSI report. The CSIs reported in the first part are complete and self-interpretable. Therefore, the first part would have a constant size. The second part (1003, 1004), on the other hand, would hold a CSI for NCJT hypothesis which size can be determined based on the bitmap indicator in the first part (1006). Regarding PMI reporting for NCJT, each element of a bitmap corresponds to a component of PMI denoted as $i_{x,y,z}$ element of $S=\{i_{x,y,z}\}$. If the corresponding element is set to 1, then a separate PMI component $i_{x,y,z}$ is reported in second part for NCJT hypothesis.

Conversely, if the corresponding bit is set to 0, then a separate PMI component $i_{x,y,z}$ is not reported in the second part for NCJT hypothesis, and the one reported for sTRP hypothesis in the first part would be used instead. As an example, for type II codebook the beam group is indicated by indicator $i_{1,2}$ [3]. If the bit that corresponds to $i_{1,2}$ is set to 0, then the beam group reported for sTRP is used for NCJT hypothesis too.

The set of indicators $S=\{i_{x,y,z}\}$ that can possibly be omitted in the second part of CSI report could be a predefined set or configured via RRC. In the first case, the size of the bit-map itself would be fixed while in the latter case it would be variable. As a part of embodiment II.2, two methods of determining the possible set of PMI components to be share among the two hypotheses are disclosed. In the two extreme cases, if all elements of this bitmap are set to 0s or 1s, then the CSI reporting can be referred as unrestricted or fully-shared CSI reporting.

Method II-2.1: The possible PMI components to be shared (omitted), i.e., the possible elements of $S=\{i_{x,y,z}\}$ given as $P=\{i_{x,y,z}\}$ where $S \subseteq P$, is configured by RRC IE possiblePMIComponentsToBeOmittedNCJT and could also be full set of PMI components.

Method II-2.2: The possible PMI components to be shared (omitted), i.e., the possible elements $S=\{i_{x,y,z}\}$ given as $P=\{i_{x,y,z}\}$ where $S \subseteq P$, is prespecified and could also be full set of PMI components.

In another embodiment (II.2.2), TABLE I illustrates the possible PMI components to be partially/fully be omitted for NCJT hypotheses depending on the codebook type employed. These PMI components may be prespecified as per Method II-2.2 or can be configured via RRC based on Method II-2.1.

presented by taking M=2 as an example. Consequently, the term "NCJT CMR pair" is used instead of "NCJT CMR set". The exemplary number M=2 is chosen for discussion purpose only and in no way limits the generality and applicability of the disclosed methods. Additionally, K1 and K2 CMRs can be configured in each group when M=2 TRPs.

The CMRs for NCJT and sTRP hypotheses can be shared based on the availability of multiple receiver panels at the UE and the condition of inter-TRP interference. When a gNB enables CMR sharing among sTRP and NCJT measurement hypotheses, a CMR in an NCJT CMR pair can also be used for sTRP channel measurement. In the following, methods for indicating CMR sharing among sTRP and NCJT measurement hypotheses are disclosed.

Method III.1: When a gNB enables CMR sharing among sTRP and NCJT measurement hypotheses and when N CMR pairs are configured where each CMR pair consists of CMRs associated to different TRPs, a gNB may indicate by an RRC signaling which CMR pairs among the N CMR pairs are shared with sTRP measurement hypotheses. In other words, a UE may report a sTRP measurement based on a CMR in a CMR pair which is indicated to be shared among sTRP and NCJT measurement hypotheses.

Method III.1.1: According to Method III.1, upon gNB's indication of which NCJT CMR pairs are shared with sTRP measurement hypotheses, Method III.1.1 indicates by an N-bits RRC indicator where the most significant bit (MSB) corresponds to the first NCJT CMR pair and the least significant bit (LSB) corresponds to the last NCJT CMR pair. When the n-th bit is set to "1", the CMRs in the n-th NCJT CMR pair can also be shared with the sTRP measurement. Otherwise, when the n-th bit in this indicator is set to "0", the CMRs in n-th NCJT CMR pair cannot be used for sTRP measurement.

Method III.1.2: According to Method III.1, upon gNB's indication of which NCJT CMR pairs are shared with sTRP measurement hypotheses, Method III.1.2 indicates by an $\lceil \log_2(N) \rceil$-bits RRC indicator where the value n in this indicator indicates the CMRs in the first or last n+1 CMR pairs can be used for sTRP measurement.

Method III.1.3: According to Method III. 1, upon gNB's indication of which NCJT CMR pairs are shared with sTRP measurement hypotheses, Method III.1.3 indicates by an

TABLE 1

| Codebook type | Format | possiblePMIComponentsToBeOmittedNCJT |
|---|---|---|
| 1. Type I Single-Panel [3] | $W^{(1)}W^{(2)}$ | All PMI components related to $W^{(1)}$ and $W^{(2)}$ |
| 2. Type I Multi-Panel [3] | $W^{(1)}W^{(2)}$ | All PMI components related to $W^{(1)}$ and $W^{(2)}$ |
| 3. Type II [3] | $W^{(1)}W^{(2)}$ | All PMI components related to $W^{(1)}$ |
| 4 Type II Port Selection [3] | $W^{(1)}W^{(2)}$ | All PMI components related to $W^{(1)}$ |
| 4. Enhanced Type II [5] | $W^{(1)}W^{(2)}W_f$ | All PMI components related to $W^{(1)}$ and $W_f$ |
| 5. Enhanced Type II Port Selection [5] | $W^{(1)}W^{(2)}W_f$ | All PMI components related to $W^{(1)}$ and $W_f$ |
| 6. Delay-reciprocity FDD Enhanced Type II port selection [1] | $W^{(1)}W^{(2)}W_f$ | All PMI components related to $W^{(1)}$ and $W_f$ |

Method III: CMR sharing among sTRP and NCJT measurement hypotheses

In another embodiment of the disclosed invention, a method is presented to configure channel measurement resources (CMRs) for sTRP and NCJT measurement hypotheses. The gNB may configure M groups of CMRs which correspond to the M TRPs. Moreover, the gNB may configure N NCJT CMR sets where each NCJT CMR set contains M CMRs. The M CMRs in each NCJT CMR set are selected from the M CMR groups and hence correspond to the M TRPs. In the following, multiple embodiments are $$\left\lceil \log_2 \binom{N}{L} \right\rceil - \text{bits}$$

bits RRC indicator where the value in this indicator indicates the CMRs in L out of N CMR pairs can be used for sTRP measurement. The value L can be preconfigured or indicated by an RRC signaling.

Figure 11:
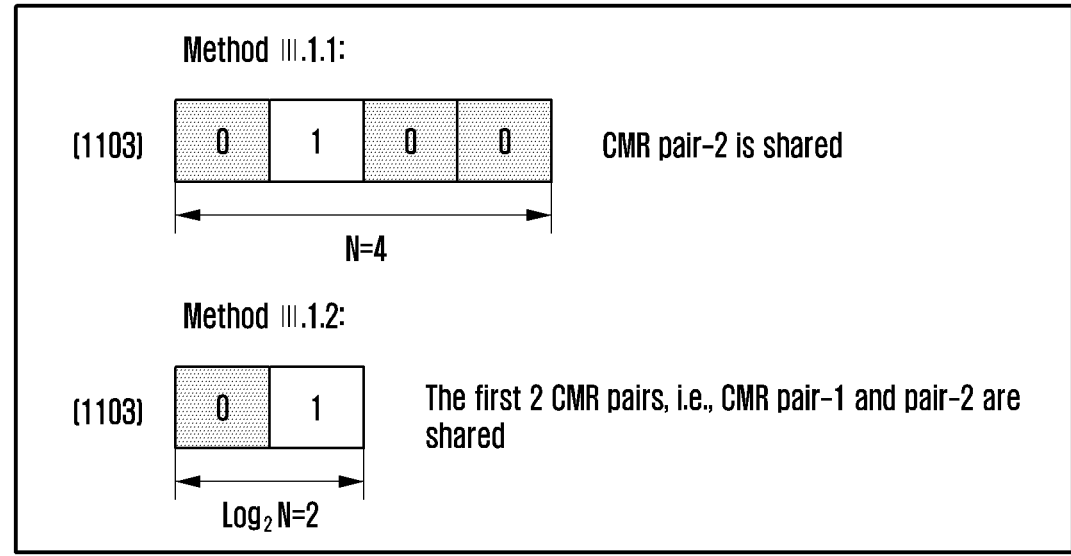
FIG. 11 depicts an example for another realization of the part of disclosed invention with indication of CMR sharing among sTRP and NCJT measurement hypotheses.

An exemplary illustration is given in FIG. 11. In the figure, two CMR groups associated with 2 TRPs are configured (1101). Moreover, N CMR pairs are configured (1102) where the two CMRs in each CMR pair are selected from the two CMR groups. A CMR sharing method, Method III.1.1 (1103) indicates which CMR pair(s) are shared for sTRP measurement. In the illustrated example, among N=4 CMR pairs the $2^{nd}$ one is shared between sTRP and NCJT measurements as all but the $2^{nd}$ bit of (1103) are set to 0.

In another illustrative example (1104), an indicator based on Method III.1.2 indicates which CMR pairs are shared among the N CMR pairs in (1102). In the example, the first 2 CMR pairs are shared among NCJT and sTRP measurement hypotheses as the indicated value "01" is mapped to the first 2 CMR pairs.

In accordance with an aspect of the present disclosure, a method performed by a terminal in a wireless communication system is provided. The method includes receiving, from a base station, configuration information on a channel state information (CSI) report, the configuration information including a parameter associated with an enablement of at least one of configurations of precoding matrix index (PMI) feedback for the sTRP and mTRP operating on non-coherent joint transmission (NCJT) mode.

In accordance with another aspect of the present disclosure, a method performed by a base station in a wireless communication system is provided, the method includes transmitting, to a terminal, configuration information on a CSI report, the configuration information including a parameter associated with an enablement of at least one of configurations of precoding matrix index (PMI) feedback for measurement hypotheses based on the sTRP and mTRP operating on NCJT mode.

In accordance with another aspect of the present disclosure, a method performed by a terminal in a wireless communication system is provided. The method includes transmitting, from a user terminal, CSI, wherein the CSI includes two parts associated to measurement hypotheses based on sTRP and mTRP operating on NCJT mode.

In accordance with another aspect of the present disclosure, a method performed by a base station in a wireless communication system is provided, the method includes receiving, from a user terminal, channel state information, wherein the channel state information includes two parts associated to measurement hypotheses based on sTRP and mTRP operating on NCJT mode.

In accordance with another aspect of the present disclosure, a method performed by a base station in a wireless communication system is provided, the method includes combining a partially reported channel state information from a user terminal for NCJT hypothesis with a complementary CSI reported for measurement hypothesis based on sTRP hypotheses in a two-parts CSI reporting.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

Abbreviations

2D Two-dimensional
ACK Acknowledgement
AoA Angle of arrival
AoD Angle of departure
ARQ Automatic Repeat Request
BW Bandwidth
CDM Code Division Multiplexing
CP Cyclic Prefix
C-RNTI Cell RNTI
CRS Common Reference Signal
CRI CSI-RS resource indicator
CSI Channel State Information
CSI-RS Channel State Information Reference Signal
CQI Channel Quality Indicator
DCI Downlink Control Information
dB deciBell
DL Downlink
DL-SCH DL Shared Channel
DMRS Demodulation Reference Signal
eMBB Enhanced mobile broadband
eNB eNodeB (base station)
FDD Frequency Division Duplexing
FDM Frequency Division Multiplexing
FFT Fast Fourier Transform
HARQ Hybrid ARQ
IFFT Inverse Fast Fourier Transform
LAA License assisted access
LBT Listen before talk
LTE Long-term Evolution
MIMO Multi-input multi-output
mMTC massive Machine Type Communications
MTC Machine Type Communications
MU-MIMO Multi-user MIMO
NACK Negative ACKnowledgement
NW Network
OFDM Orthogonal Frequency Division Multiplexing
PBCH Physical Broadcast Channel
PDCCH Physical Downlink Control Channel
PDSCH Physical Downlink Shared Channel
PHY Physical layer
PRB Physical Resource Block
PMI Precoding Matrix Indicator
PSS Primary Synchronization Signal
PUCCH Physical Uplink Control Channel
PUSCH Physical Uplink Shared Channel
QOS Quality of service
RAN Radio access network
RAT Radio access technology
RB Resource Block
RE Resource Element
RI Rank Indicator
RRC Radio Resource Control
RS Reference Signals
RSRP Reference Signal Received Power
SDM Space Division Multiplexing
SINR Signal to Interference and Noise Ratio
SPS Semi-Persistent Scheduling
SRS Sounding RS
SF Subframe
SSS Secondary Synchronization Signal
SU-MIMO Single-user MIMO TDD Time Division Duplexing
TDM Time Division Multiplexing
TB Transport Block
TP Transmission point
TRP Transmission reception point
TTI Transmission time interval
UCI Uplink Control Information
UE User Equipment
UL Uplink
UL-SCH UL Shared Channel
URLLC Ultra-reliable low-latency communication

The invention claimed is:

1. A user equipment (UE) in a communication system, the UE comprising:
a transceiver; and
a controller configured to:
receive, from a base station, configuration information including a parameter associated with an enablement of a first precoding matrix indicator (PMI) for a single transmit-receive point (TRP) and a second PMI for multiple TRPs operating on a non-coherent joint transmission (NCJT) mode;
generate channel state information (CSI) including at least one of the first PMI for the single TRP or the second PMI for the multiple TRPs, based on UE capability, and whether a configuration associated with a partial PMI is configured; and
transmit, to the base station, the CSI including at least one of the first PMI for the single TRP or the second PMI for the multiple TRPs.

2. The UE of claim 1, wherein, in case that the UE is not capable of computing the second PMI for the multiple TRPs, the CSI includes the first PMI for the single TRP,
wherein, in case that the UE is capable of computing the second PMI for the multiple TRPs and the configuration associated with the partial PMI is configured, the CSI includes the first PMI for the single TRP and at least a part of the second PMI for the multiple TRPs, and
wherein, in case that the UE is capable of computing the second PMI for the multiple TRPs and the configuration associated with the partial PMI is not configured, the CSI includes the first PMI for the single TRP and the second PMI for the multiple TRPs.

3. The UE of claim 1, wherein the CSI comprises a first part CSI for the single TRP and a second part CSI for the multiple TRPs, and
wherein the first part CSI includes a first indicator to indicate a presence of the second part of CSI, and a second indicator to indicate whether predefined PMI components are present in the second part CSI.

4. The UE of claim 1, wherein the CSI comprises a first part CSI for the single TRP and a second part CSI for the multiple TRPs, and
wherein the first part CSI for the single TRP includes a bitmap indicator to indicate whether a PMI component corresponding to each bit of the bitmap indicator is present in the second part CSI.

5. A base station in a communication system, the base station comprising:
a transceiver; and
a controller configured to:
transmit, to a user equipment (UE), configuration information including a parameter associated with an enablement of a first precoding matrix indicator (PMI) for a single transmit-receive point (TRP) and a second PMI for multiple TRPs operating on a non-coherent joint transmission (NCJT) mode; and
receive, from the UE, channel state information (CSI), wherein the CSI includes at least one of the first PMI for the single TRP or the second PMI for the multiple TRPs based on UE capability, and whether a configuration associated with a partial PMI is configured.

6. The base station of claim 5, wherein, in case that the UE is not capable of computing the second PMI for the multiple TRPs, the CSI includes the first PMI for the single TRP,
wherein, in case that the UE is capable of computing the second PMI for the multiple TRPs and the configuration associated with the partial PMI is configured, the CSI includes the first PMI for the single TRP and at least a part of the second PMI for the multiple TRPs, and
wherein, in case that the UE is capable of computing the second PMI for the multiple TRPs and the configuration associated with the partial PMI is not configured, the CSI includes the first PMI for the single TRP and the second PMI for the multiple TRPs.

7. The base station of claim 5, wherein the CSI comprises a first part CSI for the single TRP and a second part CSI for the multiple TRPs, and
wherein the first part CSI includes a first indicator to indicate a presence of the second part of CSI, and a second indicator to indicate whether predefined PMI components are present in the second part CSI.

8. The base station of claim 5, wherein the CSI comprises a first part CSI for the single TRP and a second part CSI for the multiple TRPs, and
wherein the first part CSI for the single TRP includes a bitmap indicator to indicate whether a PMI component corresponding to each bit of the bitmap indicator is present in the second part CSI.

9. A method performed by a user equipment (UE) in a communication system, the method comprising:
receiving, from a base station, configuration information including a parameter associated with an enablement of a first precoding matrix indicator (PMI) for a single transmit-receive point (TRP) and a second PMI for multiple TRPs operating on a non-coherent joint transmission (NCJT) mode;
generating channel state information (CSI) including at least one of the first PMI for the single TRP or the second PMI for the multiple TRPs, based on UE capability, and whether a configuration associated with a partial PMI is configured; and
transmitting, to the base station, the CSI including at least one of the first PMI for the single TRP or the second PMI for the multiple TRPs.

10. The method of claim 9, wherein, in case that the UE is not capable of computing the second PMI for the multiple TRPs, the CSI includes the first PMI for the single TRP,
wherein, in case that the UE is capable of computing the second PMI for the multiple TRPs and the configuration associated with the partial PMI is configured, the CSI includes the first PMI for the single TRP and at least a part of the second PMI for the multiple TRPs, and
wherein, in case that the UE is capable of computing the second PMI for the multiple TRPs and the configuration associated with the partial PMI is not configured, the CSI includes the first PMI for the single TRP and the second PMI for the multiple TRPs.

11. The method of claim 9, wherein the CSI comprises a first part CSI for the single TRP and a second part CSI for the multiple TRPs, and wherein the first part CSI includes a first indicator to indicate a presence of the second part of CSI, and a second indicator to indicate whether predefined PMI components are present in the second part CSI.

12. The method of claim 9, wherein the CSI comprises a first part CSI for the single TRP and a second part CSI for the multiple TRPs, and wherein the first part CSI for the single TRP includes a bitmap indicator to indicate whether a PMI component corresponding to each bit of the bitmap indicator is present in the second part CSI.

13. A method performed by a base station in a communication system, the method comprising:

transmitting, to a user equipment (UE), configuration information including a parameter associated with an enablement of a first precoding matrix indicator (PMI) for a single transmit-receive point (TRP) and a second PMI for multiple TRPs operating on a non-coherent joint transmission (NCJT) mode; and receiving, from the UE, channel state information (CSI), wherein the CSI includes at least one of the first PMI for the single TRP or the second PMI for the multiple TRPs based on UE capability, and whether a configuration associated with a partial PMI is configured.

14. The method of claim 13, wherein, in case that the UE is not capable of computing the second PMI for the multiple TRPs, the CSI includes the first PMI for the single TRP, wherein, in case that the UE is capable of computing the second PMI for the multiple TRPs and the configuration associated with the partial PMI is configured, the CSI includes the first PMI for the single TRP and at least a part of the second PMI for the multiple TRPs, and wherein, in case that the UE is capable of computing the second PMI for the multiple TRPs and the configuration associated with the partial PMI is not configured, the CSI includes the first PMI for the single TRP and the second PMI for the multiple TRPs.

15. The method of claim 13, wherein the CSI comprises a first part CSI for the single TRP and a second part CSI for the multiple TRPs, and wherein the first part CSI includes a first indicator to indicate a presence of the second part of CSI, and a second indicator to indicate whether predefined PMI components are present in the second part CSI.

* * * * *